United States Patent
Avraham et al.

(10) Patent No.: US 10,541,940 B2
(45) Date of Patent: Jan. 21, 2020

(54) QUALITY OF SERVICE (QOS) STORED PROCEDURES

(71) Applicant: INTERNATIONAL BUSINESS MACHINES CORPORATION, Armonk, NY (US)

(72) Inventors: Amalia Avraham, Petach Tikva (IL); Alon Marx, Matan (IL); Rivka M. Matosevich, Zirchon-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 15/585,370

(22) Filed: May 3, 2017

(65) Prior Publication Data

US 2018/0324108 A1    Nov. 8, 2018

(51) Int. Cl.
| | |
|---|---|
| *H04L 29/06* | (2006.01) |
| *H04L 12/927* | (2013.01) |
| *H04L 29/08* | (2006.01) |
| *H04L 12/24* | (2006.01) |

(52) U.S. Cl.
CPC ........ *H04L 47/805* (2013.01); *H04L 41/0816* (2013.01); *H04L 67/1097* (2013.01)

(58) Field of Classification Search
CPC .................................................... H04L 47/805
See application file for complete search history.

(56) References Cited

U.S. PATENT DOCUMENTS

| | | | |
|---|---|---|---|
| 7,120,122 B1 * | 10/2006 | Starr | H04L 41/5022 370/250 |
| 9,311,161 B2 | 4/2016 | Jagtap | |
| 2016/0028854 A1 * | 1/2016 | Leeb | H04L 67/10 709/203 |
| 2016/0149769 A1 | 5/2016 | Joshi et al. | |

OTHER PUBLICATIONS

"SolidFire AI for Virtual Infrastructure," SolidFire, Agile Infrastructure, Solution Brief, http://www.flasharrayworks.com/datasheets/SolidFire_AI_Virtual_Infrastructure_SolutionBrief.pdf (2 pages).
Emeakaroha et al., "Low Level Metrics to High Level SLAs—LoM2HiS Framework: Bridging the Gap Between Monitored Metrics and SLA Parameters in Cloud Environments," HPCS, IEEE 2010 (7 pages).
Rao et al., "QoS Guarantees and Service Differentiation for Dynamic Cloud Applications," IEEE Trans on Network and Service Management, 10.1, 2013 (14 pages).

(Continued)

*Primary Examiner* — Adnan M Mirza
(74) *Attorney, Agent, or Firm* — Griffiths & Seaton PLLC

(57) ABSTRACT

Embodiments for performance management in a computing storage environment. At least one of a plurality of performance characteristics associated with a quality of service (QoS) between a storage system and a host is dynamically controlled by uploading code of a QoS logic, from the host to the storage system, for determining and specifying the at least one of the plurality of performance characteristics, thereby reducing overhead of QoS management data required to be stored within or communicated to the storage system.

21 Claims, 6 Drawing Sheets

(56) References Cited

OTHER PUBLICATIONS

Ferretti et al., "QoS-aware Clouds," 2010 IEEE 3rd International Conference on Cloud Computing, IEEE Computer Society, 2010 (8 pages).

Trajkovska et al., "A Novel P2P and Cloud Computing Hybrid Architecture for Multimedia Streaming with QoS Cost Functions," Proceedings of the 18th ACM International Conference on Multimedia, ACM, 2010 (4 pages).

Mohamed et al., "An Automatic Approach to Manage Elasticity of Business Processes in the Cloud," Future Generation Computer Systems, 50, Oct. 15, 2014 (17 pages).

\* cited by examiner

500

```
┌─────────────────────────────────────────────────────────────────────┐
│  DYNAMICALLY CONTROL AT LEAST ONE OF A PLURALITY OF PERFORMANCE     │
│  CHARACTERISTICS ASSOCIATED WITH A QUALITY OF SERVICE (QOS) BETWEEN │──502
│  A STORAGE SYSTEM AND A HOST BY UPLOADING CODE OF A QOS LOGIC,      │
│  FROM THE HOST TO THE STORAGE SYSTEM, FOR DETERMINING AND SPECIFYING│
│  THE AT LEAST ONE OF THE PLURALITY OF PERFORMANCE CHARACTERISTICS   │
└─────────────────────────────────────────────────────────────────────┘
```

```
┌─────────────────────────────────────────────────────────────────────┐
│         DETERMINE QUALITY OF SERVICE (QOS) LOGIC BY CUSTOMER        │──602
└─────────────────────────────────────────────────────────────────────┘
                                    ▼
┌─────────────────────────────────────────────────────────────────────┐
│   PROVIDE MECHANISM TO UPLOAD THE QOS LOGIC DETERMINED BY CUSTOMER  │──604
│              AS CODE FROM HOST TO STORAGE SYSTEM                    │
└─────────────────────────────────────────────────────────────────────┘
                                    ▼
┌─────────────────────────────────────────────────────────────────────┐
│     PERFORM INITIAL RUN OF THE CODE CONTAINING THE QOS LOGIC UPON   │──606
│                    UPLOAD TO THE STORAGE SYSTEM                     │
└─────────────────────────────────────────────────────────────────────┘
                                    ▼
┌─────────────────────────────────────────────────────────────────────┐
│  PERFORM SUBSEQUENT RUNS OF THE CODE CONTAINING THE QOS LOGIC UPON  │──608
│   DETECTING EVENTS IN THE STORAGE SYSTEM RELEVANT TO QOS CALCULATIONS│
└─────────────────────────────────────────────────────────────────────┘
```

FIG. 6

QUALITY OF SERVICE (QOS) STORED PROCEDURES

BACKGROUND OF THE INVENTION

Field of the Invention

The present invention relates in general to computing systems, and more particularly to, various embodiments for performance management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems to store information and data. As wide strides in technological advancement relating to data access devices have been accomplished, there is an ever-growing demand for growth and development within the back end supporting systems that provide and store the data content.

SUMMARY OF THE INVENTION

Various embodiments for performance management in a computing storage environment, by a processor are provided. In one embodiment, by way of example only, a method comprises, dynamically controlling at least one of a plurality of performance characteristics associated with a quality of service (QoS) between a storage system and a host by uploading code of a QoS logic, from the host to the storage system, for determining and specifying at least one of the plurality of performance characteristics, thereby reducing overhead of QoS management data required to be stored within or communicated to the storage system.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a flowchart diagram illustrating an exemplary method for performance management in a computing storage environment by a processor, by which aspects of the present invention may be implemented;

FIG. 6 is an additional flowchart diagram illustrating an exemplary method for performance management in a computing storage environment by a processor, by which aspects of the present invention may be implemented.

DETAILED DESCRIPTION OF THE DRAWINGS

Figure 1:
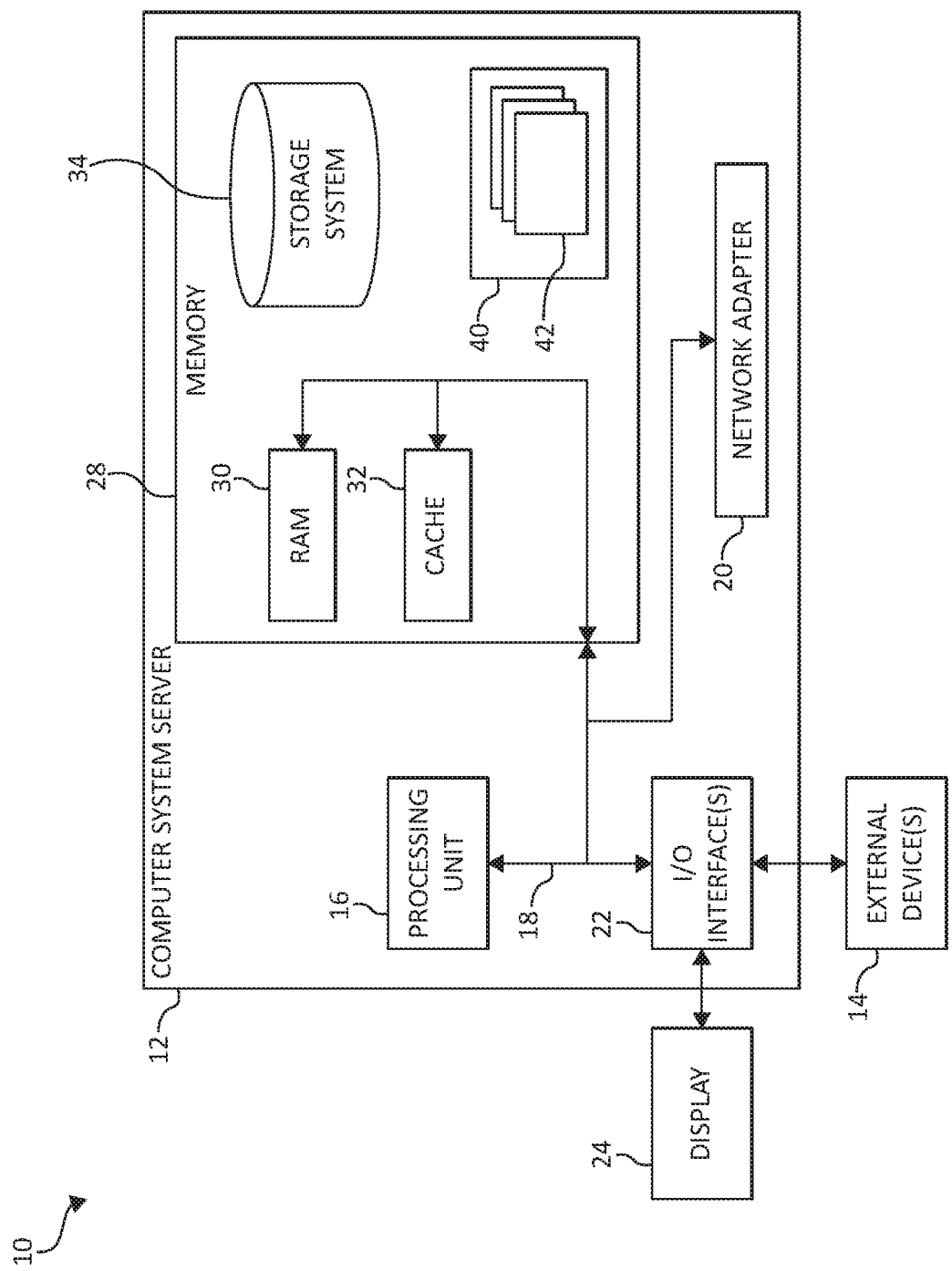
FIG. 1 is a block diagram depicting an exemplary cloud computing node according to an embodiment of the present invention.

In computer storage and networking, the vast majority of network devices process device requests indiscriminately. That is, regardless of the identity of the requestor or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In that regard, a service level agreement (SLA) can specify a guaranteed level of responsiveness associated with particular content or services irrespective of any particular requester. By comparison, quality of service (QoS) terms specify a guaranteed level of responsiveness minimally owed to particular requestors.

The policy based service differentiation model is the logical result of several factors. Firstly, the number and variety of computing applications which generate requests across networks both private and public has increased dramatically in the last decade. Each of these applications, however, have different service requirements and differentiated business value. Secondly, technologies and protocols that enable the provision of different services having different levels of security and QoS have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

Thus, in computing storage systems, the QoS feature allows the storage system to deliver different service levels to hosts that are connected to the same system. The QoS feature favors performance of critical business applications that run concurrently with non-critical applications. Because the storage system disk and cache are generally shared among all applications and all hosts are attached to the same resources, division of these resources among both critical and non-critical applications might have an unintended adverse performance effect on critical applications. QoS can address this by limiting the rate, based on bandwidth and Input/Output Operations per Second (IOPS), for non-critical applications. Limiting performance resources for non-critical applications means that the remaining resources are available without limitation for the business-critical applications.

Traditionally, when deciding on QoS terms required for a particular application, a customer would calculate the amount of data he or she needed and pay accordingly. However as of recent, especially with the dominant emergence of cloud environments, business needs are ever changing and QoS requirements are dynamic. To wit, the price for certain QoS terms is a business decision and the demands thereof may differ greatly from one customer to another, not only with regard to sheer pricing of the QoS terms but also in the way the QoS terms and pricing are calculated. Some customers may calculate QoS per volume, while others would take into account the volume size, and yet others consider the actual written size of the volume. Some customers may consider the QoS values temporary, while others would give "credit" to users that didn't utilize their share. And of course, there may be a combination of attributes to consider, like volume name (e.g. volume name begins with platinum, gold or silver) combined with volume size, which some customers might desire to implement into QoS terms in the storage system.

Several methods exist in the art to manage QoS which are either predefined within the storage system or external to the storage environment itself. Generally, QoS is implemented as a predefined set of values within the storage system, of which an administrator chooses from for a particular volume or entity. In some cases, the QoS may be specified for a particular user or group such that each user is subject to the QoS level specified by the administrator. In yet other cases, some type of external database or system handles the QoS logic for the storage environment. In any of these cases, the result is much the same, the QoS is either predefined within the storage system of which a handful of options may be selected by an administrator, or the QoS logic is handled externally and transactions are routed based on this external logic to the storage system. In the latter case, this external handling requires an immense amount of communication between the external logic and the storage, which expends precious resources to process. In the case of the former, too few predefined QoS options may be provided by the storage system for the dynamically changing business needs of the given customer.

Accordingly, to improve upon the art, the mechanisms of the present invention implement such functionality as providing a mechanism for customers to input their own QoS logic on the storage system itself. Similar to "stored procedures" operations in database management, by putting the QoS logic on the storage system, management data to control the QoS required to be stored by the storage system is reduced, and valuable resources for communicating QoS requirements from users are not incurred. Alternative embodiments are presented additionally, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
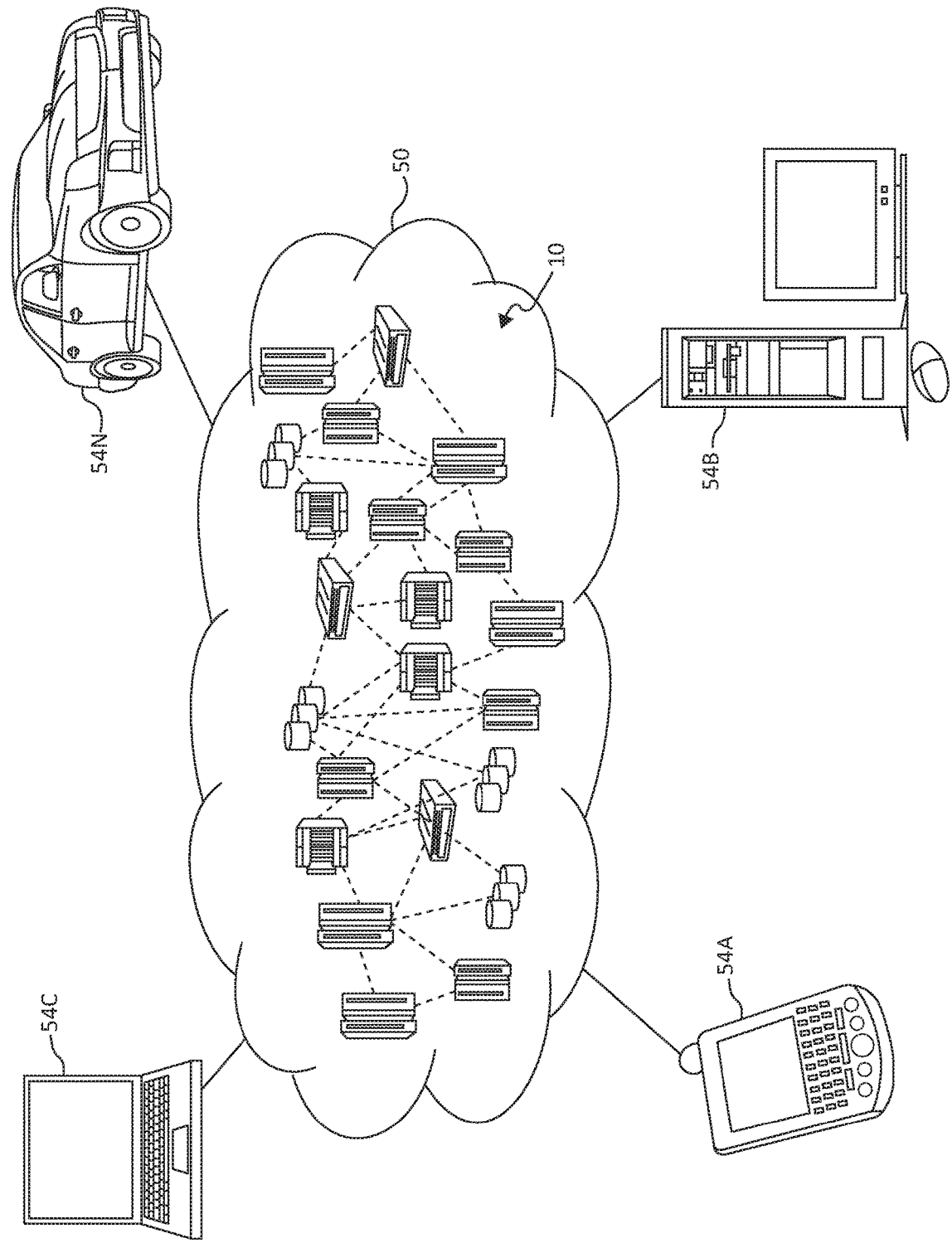
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
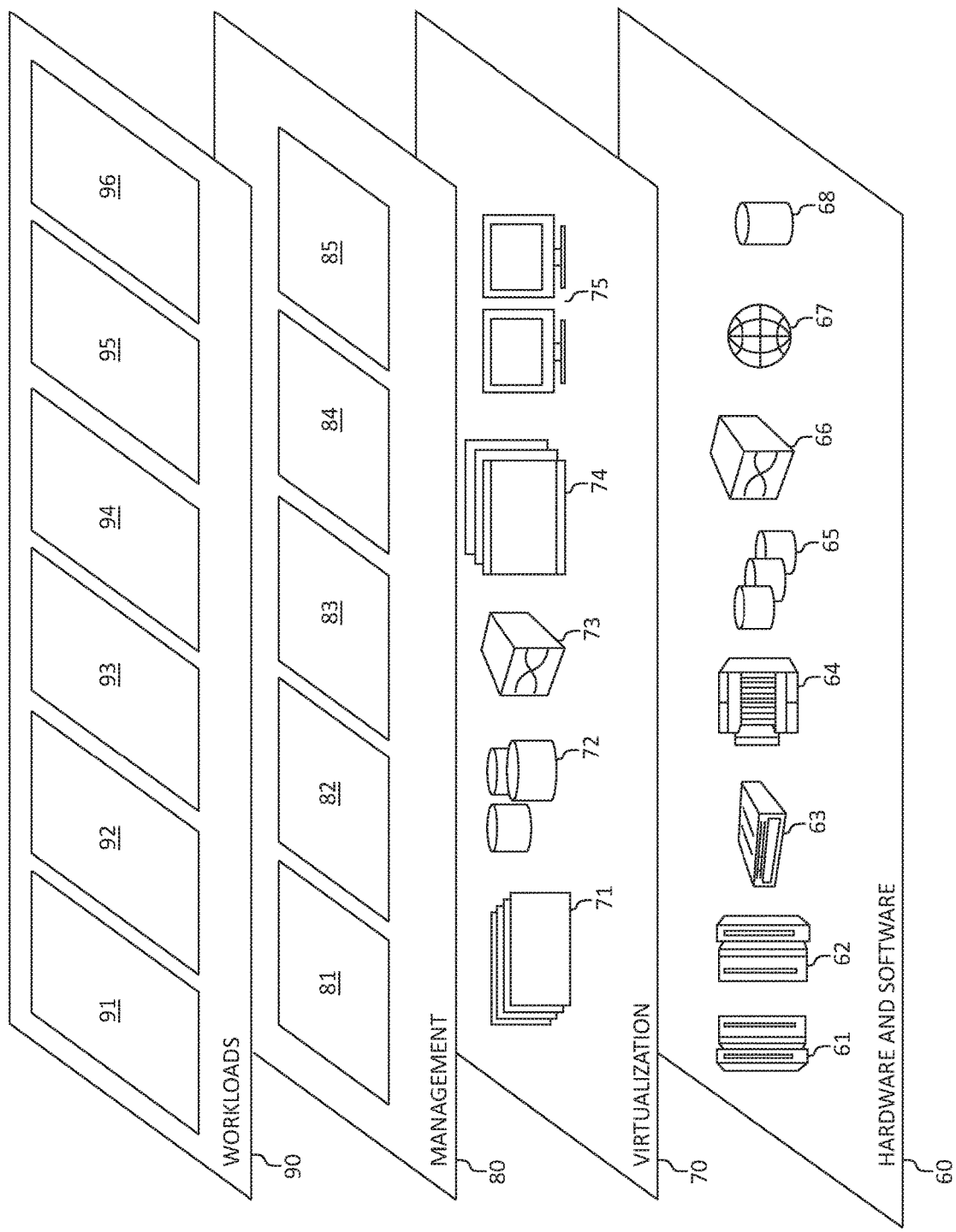
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 96, such as antivirus scanning workloads, or anti-malware scanning workloads. In addition, data security workloads and functions 96 may include such operations as data quarantining and/or data deleting functions. One of ordinary skill in the art will appreciate that the data security workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
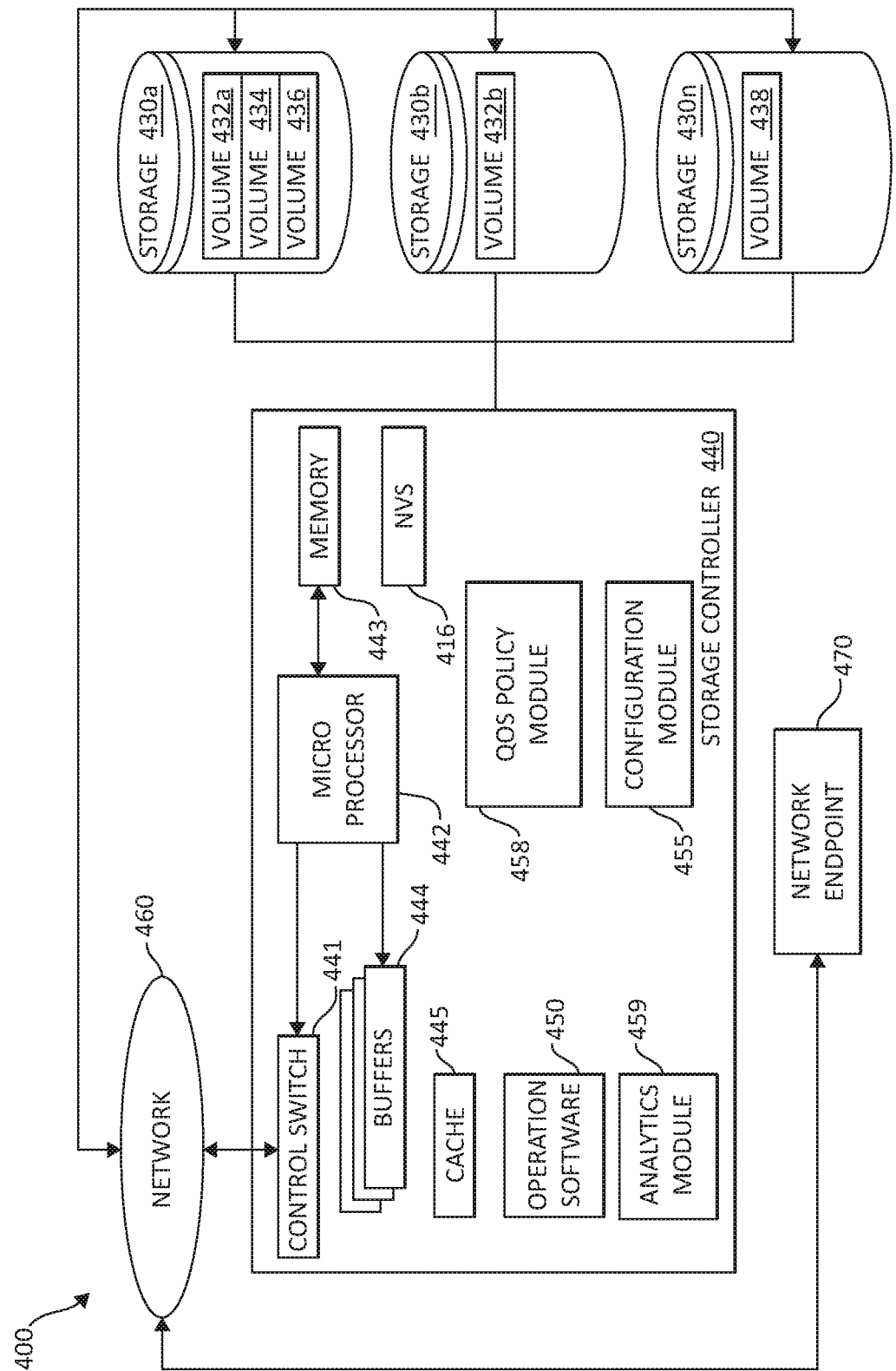
FIG. 4 is an additional block diagram depicting an exemplary hardware structure of a computing storage system in communication with the cloud computing environment, in which aspects of the present invention may be realized.

FIG. 4, following, is an additional block diagram showing a hardware structure of a data management system 400 that may be used in the overall context (i.e., as a portion of a distributed computing environment) of performing functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter 460 providing data to the storage controller 440, over such connections as Fibre channel, FICON, ESCON, Ethernet, fiber optic, wireless, or coaxial adapters. Network management system 400 is accordingly equipped with a suitable fabric (not shown in FIG. 4) or network adaptor 460 to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 460, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430a, 430b and 430n are shown as ranks in data storage system 400, and are referred to herein as rank 430a, 430b and 430n. Ranks may be local to data storage system 400, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 460. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455 and a QoS policy module 458, among other functional components. The configuration module 455 and QoS policy module 458 may operate in conjunction with each and every component of the storage controller 440, and storage devices 430. The configuration module 455 and QoS policy module 458 may be structurally one complete module or may be associated and/or included with other individual modules. The configuration module 455 and QoS policy module 458 may also be located at least partially in the cache 445 or other components, as one of ordinary skill in the art will appreciate.

The configuration module 455 and QoS policy module 458 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The QoS policy module 458 may enforce I/O rate limiting policies within and between various storage components and/or nodes. The analytics module 459 may use data analytics to identify, organize, create, delete, sequester, or perform other actions on various patterns, trends, and other characteristics identified in the tracked and scanned data over the network 460 and between other distributed computing components in a distributed computing environment. As one of ordinary skill in the art will appreciate, each respective aforementioned module may make up only a subset of various functional and/or functionally responsible entities in the data storage system 400.

Other ancillary hardware may be associated with the storage system 400. For example, as shown, the storage controller 440 includes a microprocessor 442 for controlling all functionality of the storage controller 440, a nonvolatile control memory 443 for storing a microprogram (operation software) 450 for controlling the operation of storage controller 440, cache 445 for temporarily storing (buffering) data, and buffers 444 for assisting the cache 445 to read and write data, a control switch 441 for controlling a protocol to control data transfer to or from the storage devices 430, the configuration module 455, QoS policy module 458, or other blocks of functionality, in which information may be set. Multiple buffers 444 may be implemented with the present invention to assist with the operations as described herein.

Continuing, FIG. 5 illustrates a method 500 for performance management in a computing storage environment, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins by dynamically controlling at least one of a plurality of performance characteristics associated with a quality of service (QoS) between a storage system and a host by uploading code of a QoS logic, from the host to the storage system, for determining and specifying the at least one of the plurality of performance characteristics (step 502). This reduces overhead of QoS management data required to be stored within or communicated to the storage system, and provides immediate response time to any QoS changes (i.e. mitigating the need for polling by the storage system). The method 500 ends.

As aforementioned, in one embodiment, the present invention implements functionality to control the QoS provided by the storage system to hosts by enabling a mechanism for a customer/administrator to upload code of a QoS logic to the storage system itself. By allowing the customer to upload their own QoS logic to the storage system, this provides a very wide range of control to specify QoS requirements and calculations thereof for various business requirements. The mechanism to allow the QoS logic code upload may be implemented in a variety of ways. For example, the customer may develop their own logic including storage volume and pricing calculations and upload the code via a graphical user interface (GUI) or command line interface (CLI) provided by an administrative section of the storage system. In any circumstances, the customer is responsible for determining their own QoS terms provided through their own code which is uploaded to the storage system. It should be noted, again, this QoS logic is uploaded directly to the administrative configuration portions of the storage system and not handled by an external entity. In this way, QoS terms may be defined in extreme granularity as to how the customer desires such QoS to be provided (e.g., specifying bandwidth, IOPS, or allocated space for a particular volume and allocated timeframes or users thereof, etc.)

The storage system provides the mechanism for the customer to upload their QoS logic code to the storage system, which code is then executed by the storage system upon detecting certain events have occurred. These events may be predefined such that the code executes on detecting any or all of the events, or may be selectable in portions by the customer as part of the QoS logic required by the particular circumstances. In general, the QoS logic code should be executed as an initial run upon upload to the storage system. The events of which the QoS logic code is subsequently executed upon detecting may then include, for example, volume size changes, volume characteristic changes (e.g., compression, encryption, and mirroring changes), storage system configuration changes, and/or periodically based on previous IOPS or bandwidth calculations.

FIG. 6 illustrates a method 600 for performance management in a computing storage environment, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The method 600 begins by the customer/administrator developing their QoS logic according to business needs (step 602). As aforementioned, some customers may calculate QoS per volume, volume size, and/or the actual written size of the volume. Customers may implement pricing models according to specific timing or user requirements, or desire to penalize or give credit for users which do not utilize the full portion of their paid QoS terms, etc. Any granularity may thus be defined by the customer related to IOPS, bandwidth, space allocations, and pricing thereof for the QoS provided by the storage system to the hosts, as developed within their own QoS logic code.

Proceeding from step 602, the storage system provides a mechanism for the customer to upload their developed QoS logic as code to be executed/implemented by the storage system (step 604). The code may be uploaded though an administrative function provided by the storage system via a GUI or CLI, or any other means of communicating and transmitting such code as known in the art. An initial run of the QoS logic code is performed by the storage system upon upload by the customer (step 606), and subsequent runs of the QoS logic code are performed upon detecting events in the storage system relevant to QoS calculations (step 608). Again, these events may include detecting volume size changes, volume characteristic changes (e.g., compression, encryption, and mirroring changes), storage system configuration changes, and/or the subsequent runs may be performed periodically based on previous IOPS or bandwidth calculations. The method 600 ends.

While allowing administrators/customers to upload their own QoS logic as code to be executed by the storage system has many advantages, if the code the customer attempts to upload has bugs, an upload of such could have a negative impact on the storage system as a whole. An alternative embodiment is therefore provided which allows greater flexibility than current QoS implementations provide (albeit while not furnishing the fine granularity control of the QoS logic code upload), however while maintaining less risk to the storage system.

In this alternative embodiment, a combination of a set of attributes is provided by the storage system which may be set or selectable by the user. For each attribute provided by the storage system, the user may specify a value for the given attribute, and the QoS of such is provided commensurate with the specified value for the given attribute. The attributes may include, as non-limiting examples, a volume size, a volume written size, volume metadata (e.g., specifying within an "importance" of the volume), and additional volume characteristics such as compression, encryption, and mirroring characteristics.

Each of the attributes provided by the storage system holds a value of which the user may select, and a final QoS value may be obtained by multiplying all of the specified values for each attribute together (where a missing value for a given attribute equals 1). As an example, assume a user is interested in 10 IOPS for every Gigabyte of volume size. In the attribute section, the user would specify the value '10' in the "volume size" attribute provided, and specify no values in any of the other attribute fields. Accordingly, the storage system would provide 10 IOPS for every Gigabyte of volume size as defined by the user. Alternatively, the user may issue the value '10' for only the written size of the volume (which relates better to the actual size of the volume in thin volumes). In this case, the storage system would then multiply all specified values (10×1×1 . . . etc.) and provide 10 IOPS per every Gigabyte of written size of the particular volume, according to the final QoS value (10) as defined by the user. This concept applies to both single and multiple specified values and additionally for both bandwidth and IOPS considerations.

Figure 7:
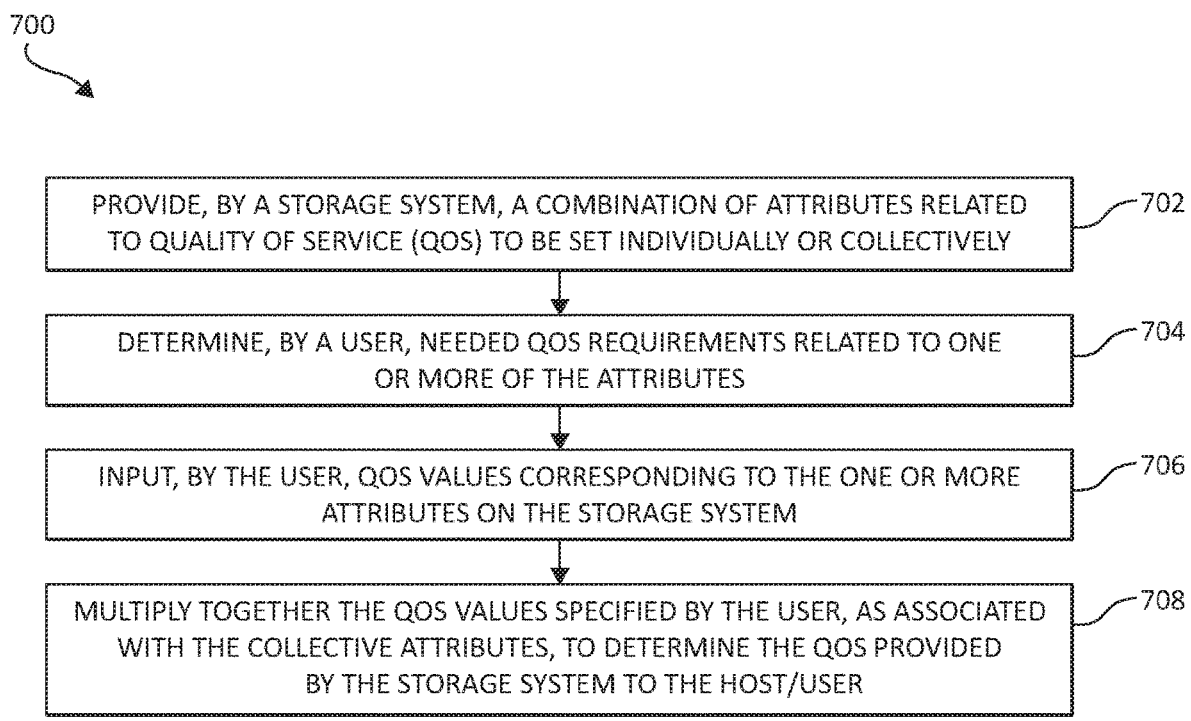
FIG. 7 is yet an additional flowchart diagram illustrating an exemplary method for performance management in a computing storage environment by a processor, by which aspects of the present invention may be implemented.

FIG. 7 illustrates a method 700 for performance management in a computing storage environment, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins by providing, by the storage system, a combination of attributes related to QoS to be set individually or collectively (step 702). As aforementioned, these attributes may include a volume size, a volume written size, volume metadata (e.g., specifying within an "importance" of the volume), and additional volume characteristics such as compression, encryption, and mirroring characteristics. A user determines needed QoS requirements for a particular volume or other entity as defined and related to one or more of the provided attributes (step 704), and inputs QoS values corresponding to the one or more attributes on the storage system (step 706). The QoS values specified by the user for one or more of the attributes are then multiplied together (as associated with the collective attributes, where a missing QoS value equals 1), to determine a final QoS value. The storage system uses these input QoS values multiplied as the final QoS value to provide the specified QoS for the given attribute from the storage system to the host/user (step 708). The method 700 ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for performance management in a computing storage environment, by a processor device, comprising:
dynamically controlling at least one of a plurality of performance characteristics associated with a quality of service (QoS) between a storage system and a host by uploading code of a QoS logic, from the host to the storage system, for determining and specifying the at least one of the plurality of performance characteristics, thereby reducing overhead of QoS management data required to be stored within or communicated to the storage system; wherein the code comprises executable program code written on the host and uploaded through an administrative interface of the storage system.

2. The method of claim 1, further including, pursuant to uploading the code of the QoS logic, defining the QoS logic by a user on the host; wherein the user specifies one or more attributes calculated commensurate with a QoS cost to determine and specify the at least one of the plurality of performance characteristics provided by the storage system to the host.

3. The method of claim 2, further including executing the code of the QoS logic by the storage system during an initial run upon upload from the host.

4. The method of claim 3, further including executing the code of the QoS logic by the storage system upon detecting that at least one of a plurality of events has occurred.

5. The method of claim 4, wherein the events are selected from a list comprising:
a storage volume size change;
a storage volume characteristic change;
a system configuration change; and
a periodic run based on previous Input/Output Operations per Second (TOPS).

6. The method of claim 5, wherein the storage volume characteristic change includes at least one of compression, encryption, and mirroring configuration changes to a given storage volume.

7. The method of claim 1, wherein the performance characteristics include at least one of an Input/Output Operations per Second (IOPS) rate, an allocated bandwidth, and an amount of allocated storage space.

8. A system for performance management in a computing storage environment, the system comprising:
a processor device executing instructions stored in a memory, wherein the processor device:
dynamically controls at least one of a plurality of performance characteristics associated with a quality of service (QoS) between a storage system and a host by uploading code of a QoS logic, from the host to the storage system, for determining and specifying the at least one of the plurality of performance characteristics, thereby reducing overhead of QoS management data required to be stored within or communicated to the storage system; wherein the code comprises executable program code written on the host and uploaded through an administrative interface of the storage system.

9. The system of claim 8, wherein the processor device, pursuant to uploading the code of the QoS logic, defines the QoS logic by a user on the host; wherein the user specifies one or more attributes calculated commensurate with a QoS cost to determine and specify the at least one of the plurality of performance characteristics provided by the storage system to the host.

10. The system of claim 9, wherein the processor device executes the code of the QoS logic by the storage system during an initial run upon upload from the host.

11. The system of claim 10, wherein the processor device executes the code of the QoS logic by the storage system upon detecting that at least one of a plurality of events has occurred.

12. The system of claim 11, wherein the events selected from a list comprising:
a storage volume size change;
a storage volume characteristic change;
a system configuration change; and
a periodic run based on previous Input/Output Operations per Second (TOPS).

13. The system of claim 12, wherein the storage volume characteristic change includes at least one of compression, encryption, and mirroring configuration changes to a given storage volume.

14. The system of claim 8, wherein the performance characteristics include at least one of an Input/Output Operations per Second (IOPS) rate, an allocated bandwidth, and an amount of allocated storage space.

15. A computer program product for performance management in a computing storage environment, by a processor device, the computer program product embodied on a non-transitory computer-readable storage medium having computer-readable program code portions stored therein, the computer-readable program code portions comprising:

an executable portion that dynamically controls at least one of a plurality of performance characteristics associated with a quality of service (QoS) between a storage system and a host by uploading code of a QoS logic, from the host to the storage system, for determining and specifying the at least one of the plurality of performance characteristics, thereby reducing overhead of QoS management data required to be stored within or communicated to the storage system; wherein the code comprises executable program code written on the host and uploaded through an administrative interface of the storage system.

16. The computer program product of claim 15, further including an executable portion that, pursuant to uploading the code of the QoS logic, defines the QoS logic by a user on the host; wherein the user specifies one or more attributes calculated commensurate with a QoS cost to determine and specify the at least one of the plurality of performance characteristics provided by the storage system to the host.

17. The computer program product of claim 16, further including an executable portion that executes the code of the QoS logic by the storage system during an initial run upon upload from the host.

18. The computer program product of claim 17, further including an executable portion that executes the code of the QoS logic by the storage system upon detecting that at least one of a plurality of events has occurred.

19. The computer program product of claim 18, wherein the events selected from a list comprising:
    a storage volume size change;
    a storage volume characteristic change;
    a system configuration change; and
    a periodic run based on previous Input/Output Operations per Second (TOPS).

20. The computer program product of claim 19, wherein the storage volume characteristic change includes at least one of compression, encryption, and mirroring configuration changes to a given storage volume.

21. The computer program product of claim 15, wherein the performance characteristics include at least one of an Input/Output Operations per Second (IOPS) rate, an allocated bandwidth, and an amount of allocated storage space.

* * * * *